(12) United States Patent
Vanhoy et al.

(10) Patent No.: US 11,167,852 B1
(45) Date of Patent: Nov. 9, 2021

(54) TRANSLATING, LOCKING, AND ROTATING LEG REST MECHANISM

(71) Applicant: B/E Aerospace, Inc., Winston-Salem, NC (US)

(72) Inventors: Mark Vanhoy, Hamptonville, NC (US); Troy Blackburn, Elkin, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/942,490

(22) Filed: Jul. 29, 2020

(51) Int. Cl.
*B64D 11/06* (2006.01)
*A47C 7/60* (2006.01)
*A47C 7/50* (2006.01)

(52) U.S. Cl.
CPC ........ *B64D 11/0643* (2014.12); *A47C 7/5066* (2018.08); *A47C 7/60* (2013.01)

(58) Field of Classification Search
CPC ....... B64D 11/0643; B60N 2/995; A47C 7/60; A47C 7/5066
See application file for complete search history.

(56) References Cited

U.S. PATENT DOCUMENTS

| | | | |
|---|---|---|---|
| 5,507,562 | A | 4/1996 | Wieland |
| 6,688,691 | B2 | 2/2004 | Marechal et al. |
| 6,764,137 | B2 | 7/2004 | Menard |
| 8,113,573 | B2 | 2/2012 | Lawson |
| 8,360,516 | B2 | 1/2013 | Dowty et al. |
| 8,602,499 | B2 | 12/2013 | Driessen et al. |
| 8,870,289 | B2 * | 10/2014 | Yin ...................... A47C 7/5068 297/423.22 |
| 9,408,472 | B2 | 8/2016 | Kim |
| 9,499,079 | B2 | 11/2016 | Meister et al. |
| 9,821,692 | B2 | 11/2017 | Vyskocil et al. |
| 10,479,250 | B2 | 11/2019 | Hur et al. |
| 10,479,251 | B2 | 11/2019 | Hur et al. |
| 2005/0173948 | A1 * | 8/2005 | Boehmer ............... B60N 2/995 297/69 |
| 2011/0240797 | A1 | 10/2011 | Behe |
| 2011/0298249 | A1 * | 12/2011 | Ku No .................. A47C 7/506 297/75 |
| 2015/0284092 | A1 | 10/2015 | Wilkey et al. |
| 2017/0021930 | A1 | 1/2017 | Henshaw |
| 2017/0096225 | A1 | 4/2017 | Smith et al. |

FOREIGN PATENT DOCUMENTS

| | | | | |
|---|---|---|---|---|
| EP | 1170167 | B1 | 1/2005 | |
| EP | 1099396 | B1 | 5/2005 | |
| EP | 1564139 | A2 * | 8/2005 | ............. B64D 11/06 |
| EP | 3601051 | A1 | 2/2020 | |
| GB | 2506665 | A | 4/2014 | |

* cited by examiner

*Primary Examiner* — Milton Nelson, Jr.
(74) *Attorney, Agent, or Firm* — Suiter Swantz pc llo

(57) ABSTRACT

A foot and leg rest deployment mechanism prevents the leg rest from rotating into an upright, deployed orientation until fully translated. Likewise, the deployment mechanism prevents the leg rest from translating while in an upright orientation. A rotation arm with a rotation locking channel prevents rotation until a locking arm is disengaged from the rotation locking channel via the locking arm engaging a translation locking portion of a translation channel. A single, linear actuator applies a force to cause both translation and rotation where the leg rest deployment mechanism controls the order of steps of deployment.

15 Claims, 15 Drawing Sheets

TRANSLATING, LOCKING, AND ROTATING LEG REST MECHANISM

BACKGROUND

Foot and leg rest systems in aircraft seats are complicated to implement because space and weight limitations make traditional systems unsuitable. For automatic/electronic systems, multiple actuators and complicated control systems are required.

SUMMARY

In one aspect, embodiments of the inventive concepts disclosed herein are directed to a foot and leg rest deployment mechanism that prevents the leg rest from rotating into an upright, deployed orientation until fully translated. Likewise, the deployment mechanism prevents the leg rest from translating while in an upright orientation.

In a further aspect, a single, linear actuator applies a force to cause both translation and rotation where the leg rest deployment mechanism controls order of steps of deployment.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
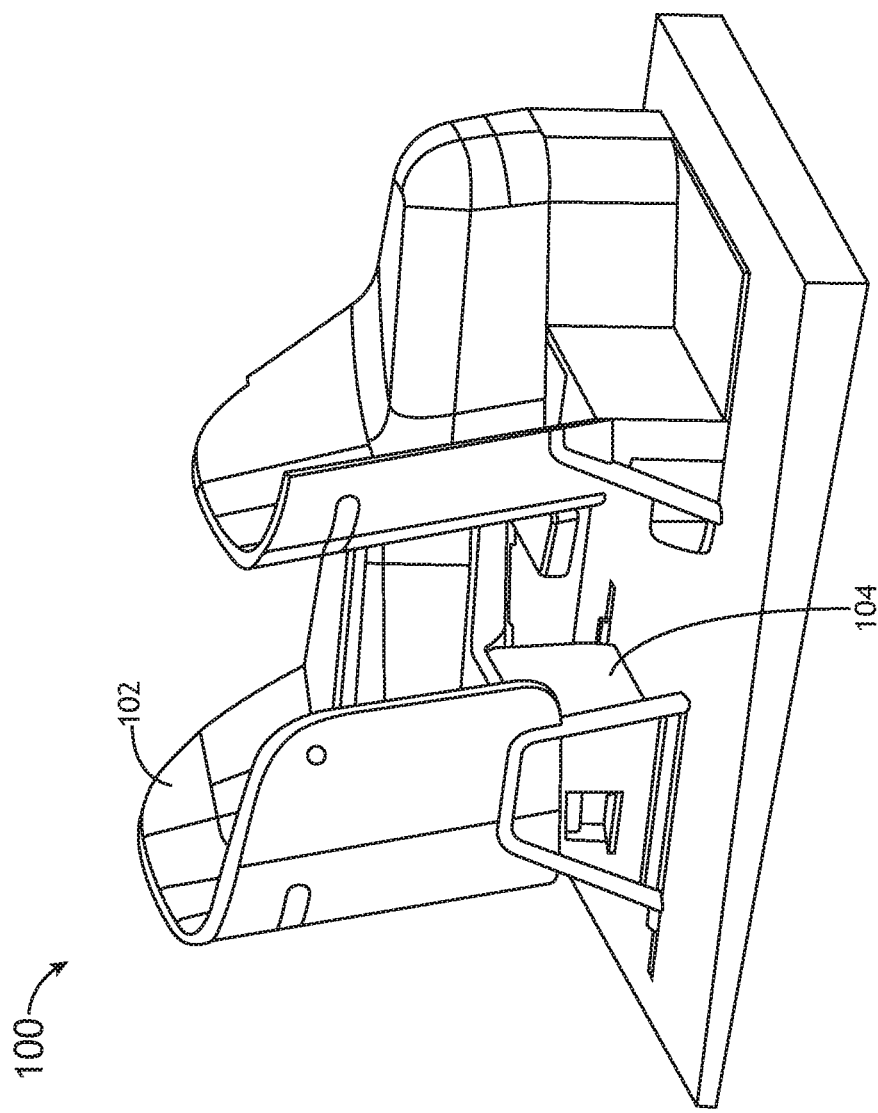
FIG. 1 shows an environmental view of an aircraft seat including an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a foot and leg rest deployment mechanism that prevents the leg rest from rotating into an upright, deployed orientation until fully translated. Likewise, the deployment mechanism prevents the leg rest from translating while in an upright orientation.

Referring to FIG. 1, an environmental view 100 of an aircraft seat 102 including an exemplary embodiment is shown. The aircraft seat 102 includes a deployable foot and leg rest 104. Because of space constraints, the foot and leg rest 104, including the deployment mechanisms, must be compact enough to fit within the footprint of existing aircraft seats. Furthermore, because of limited leg room, it is desirable that the foot and leg rest 104 be generally disposed beneath the aircraft seat 102 when stowed.

Referring to FIGS. 2A-2G, perspective views of an aircraft leg rest 204 according to an exemplary embodiment during stages of deployment and retraction are shown. An aircraft seat 200 including an embodiment of the present disclosure includes a seat portion 202 and a leg rest 204 that is completely disposed beneath the seat portion 202 when in a stowed configuration, such as in FIG. 2A. During deployment, the leg rest 204 first translates from beneath the seat portion 202, such as in FIG. 2B. Translation creates a separation 206 between the seat portion 202 and the leg rest 204 to facilitate rotation.

Figure 2A:
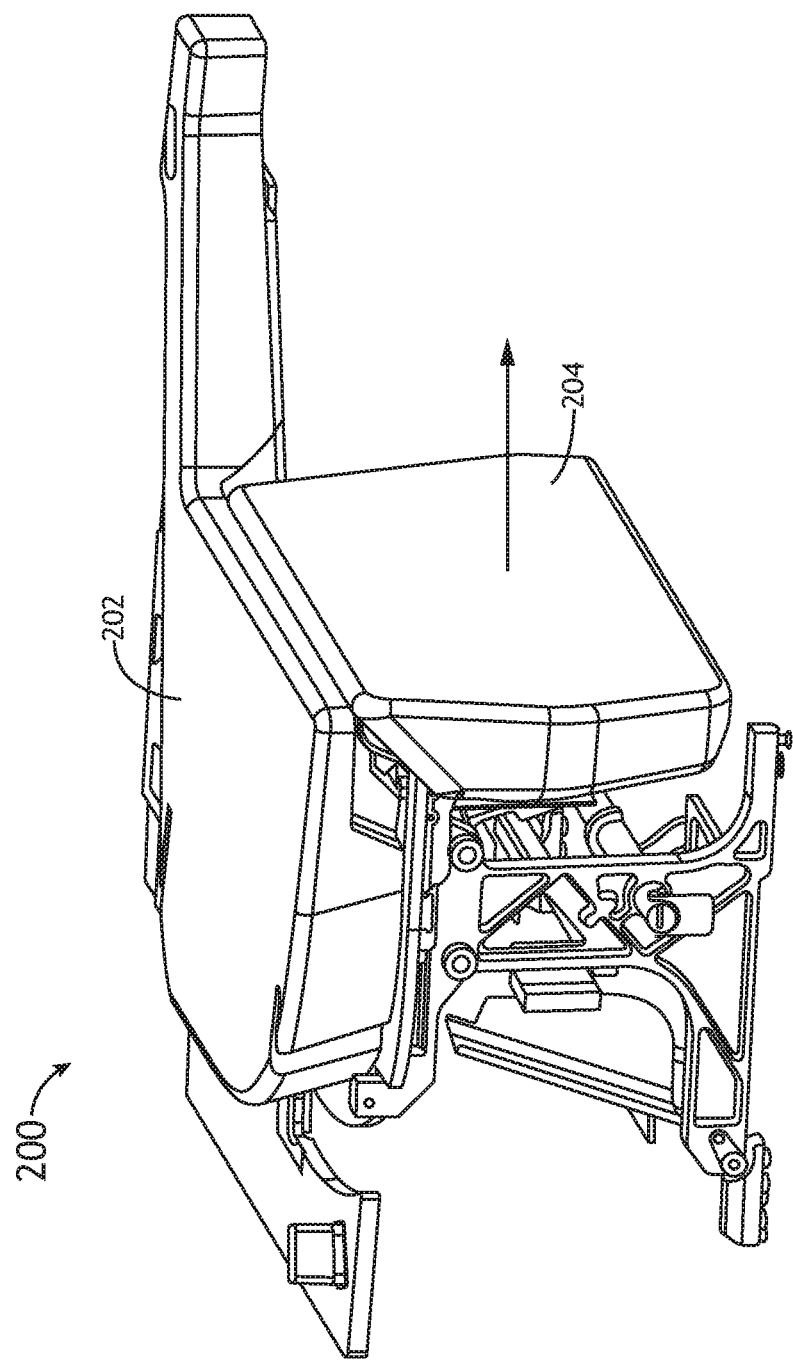
FIG. 2A shows a perspective view of an aircraft leg rest according to an exemplary embodiment during a stage of deployment and retraction.
Figure 2B:
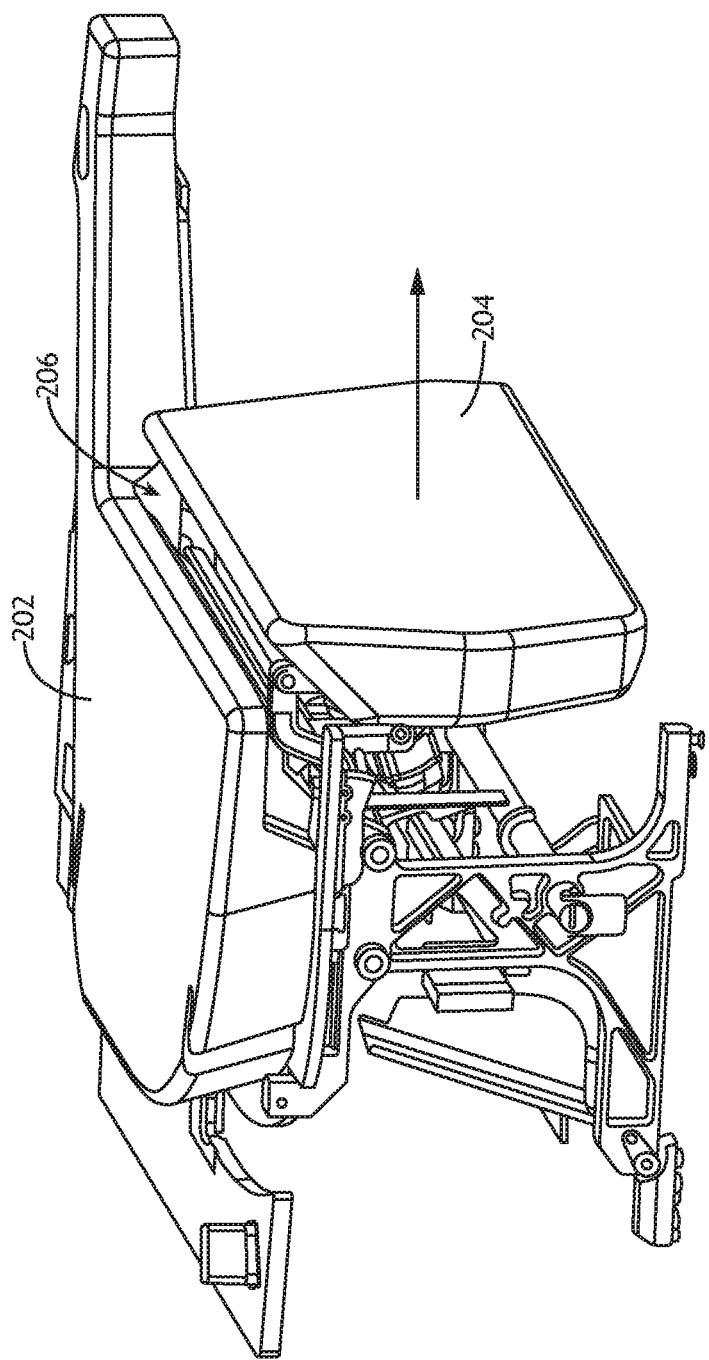
FIG. 2B shows a perspective view of an aircraft leg rest according to an exemplary embodiment during a stage of deployment and retraction.
Figure 2C:
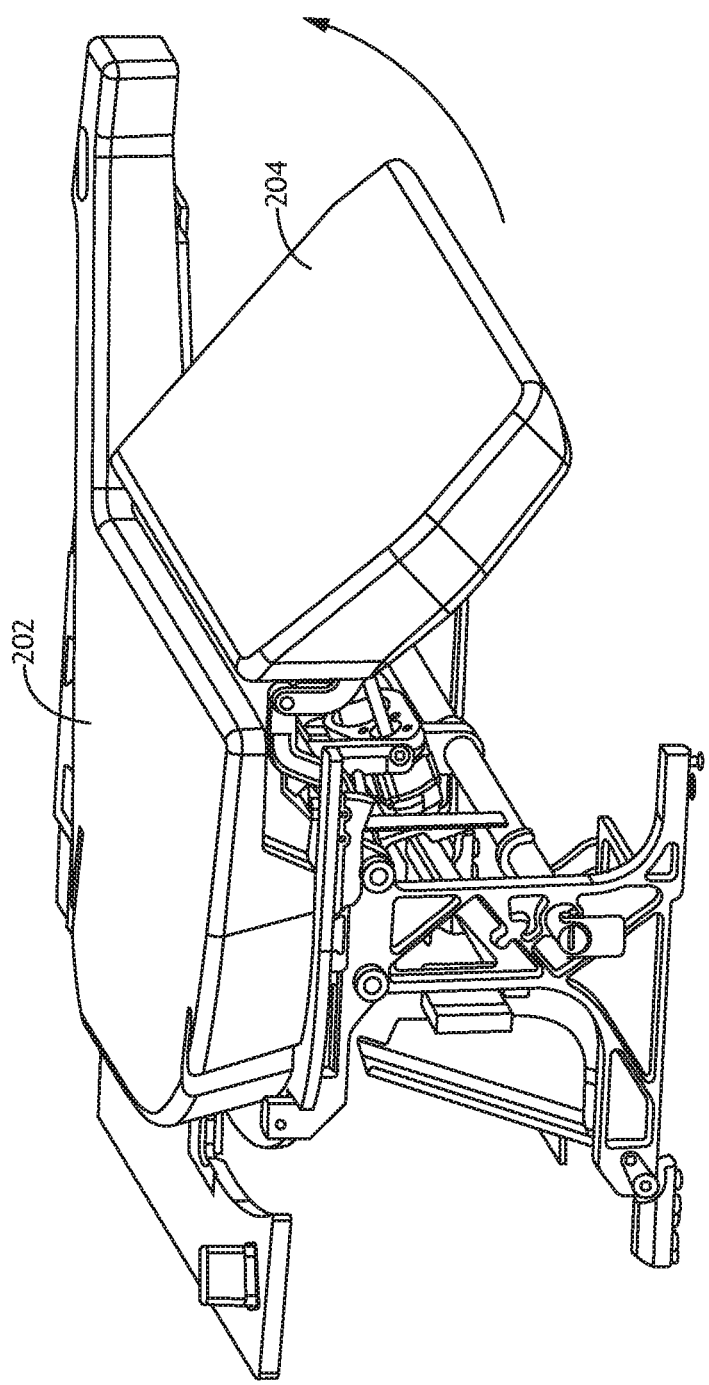
FIG. 2C shows a perspective view of an aircraft leg rest according to an exemplary embodiment during a stage of deployment and retraction.
Figure 2D:
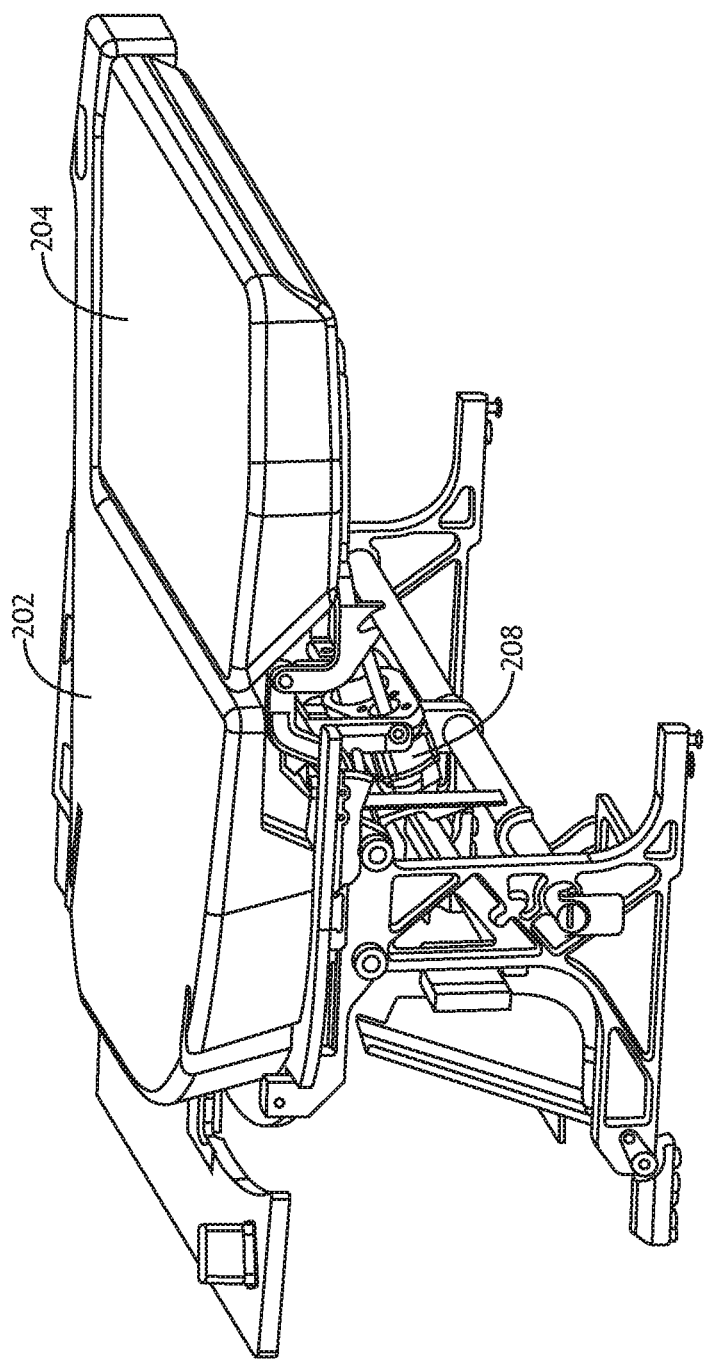
FIG. 2D shows a perspective view of an aircraft leg rest according to an exemplary embodiment during a stage of deployment and retraction.

When translation is complete, a translation lock engages to prevent translation forward or backward, and releases a rotation arm to allow the leg rest 204 to begin rotating about a pivot point proximal to the seat portion 202, such as in FIG. 2C. When fully deployed, such as in FIG. 2D, the leg rest 204 and seat portion 202 align to form a substantially planar surface. In at least one embodiment, an actuator 208 that applies the force necessary to deploy the leg rest 204 also maintains the leg rest 204 in a deployed configuration.

Figure 2E:
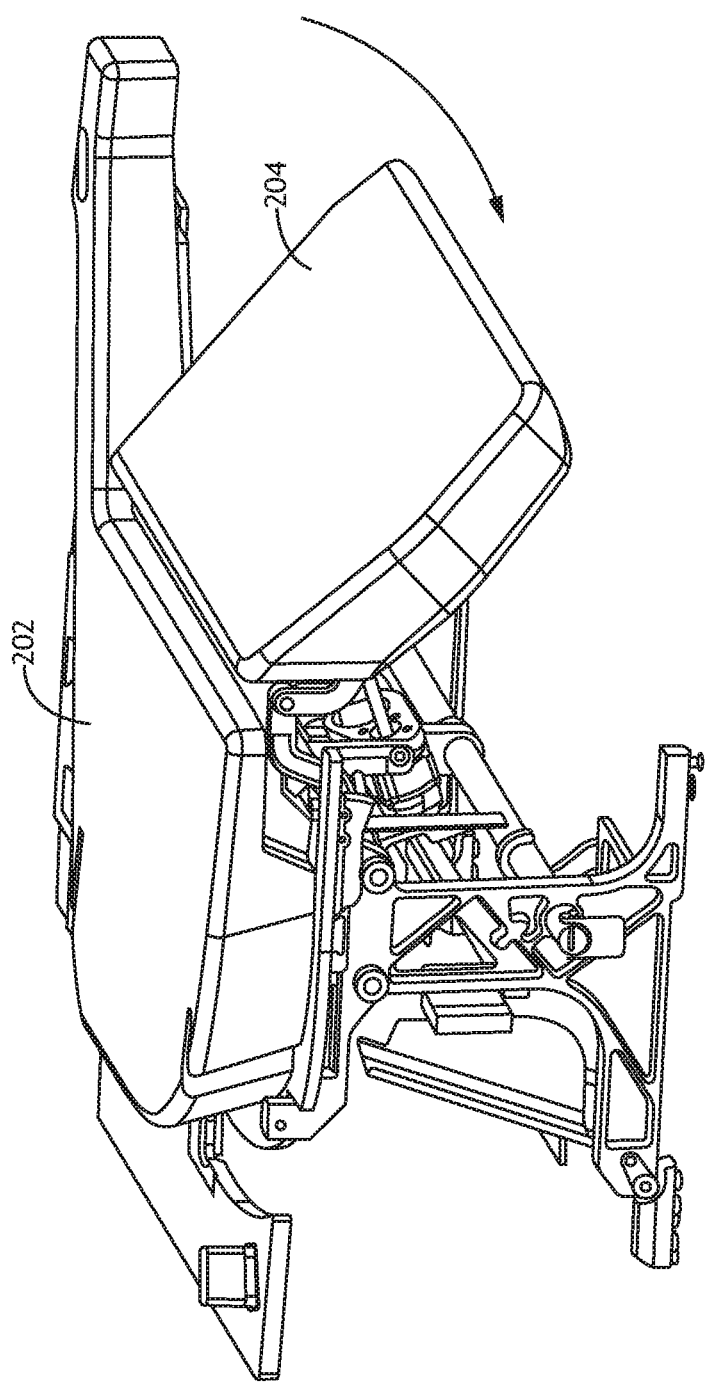
FIG. 2E shows a perspective view of an aircraft leg rest according to an exemplary embodiment during a stage of deployment and retraction.
Figure 2F:
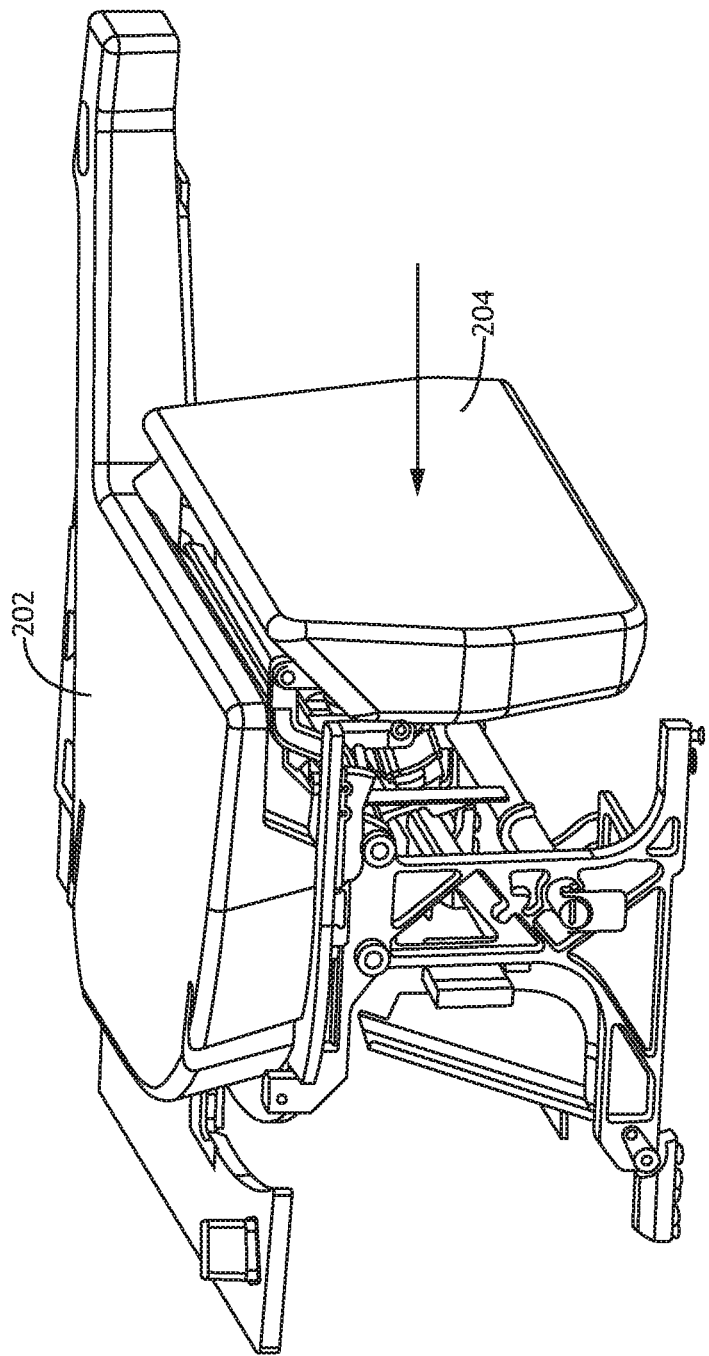
FIG. 2F shows a perspective view of an aircraft leg rest according to an exemplary embodiment during a stage of deployment and retraction.
Figure 2G:
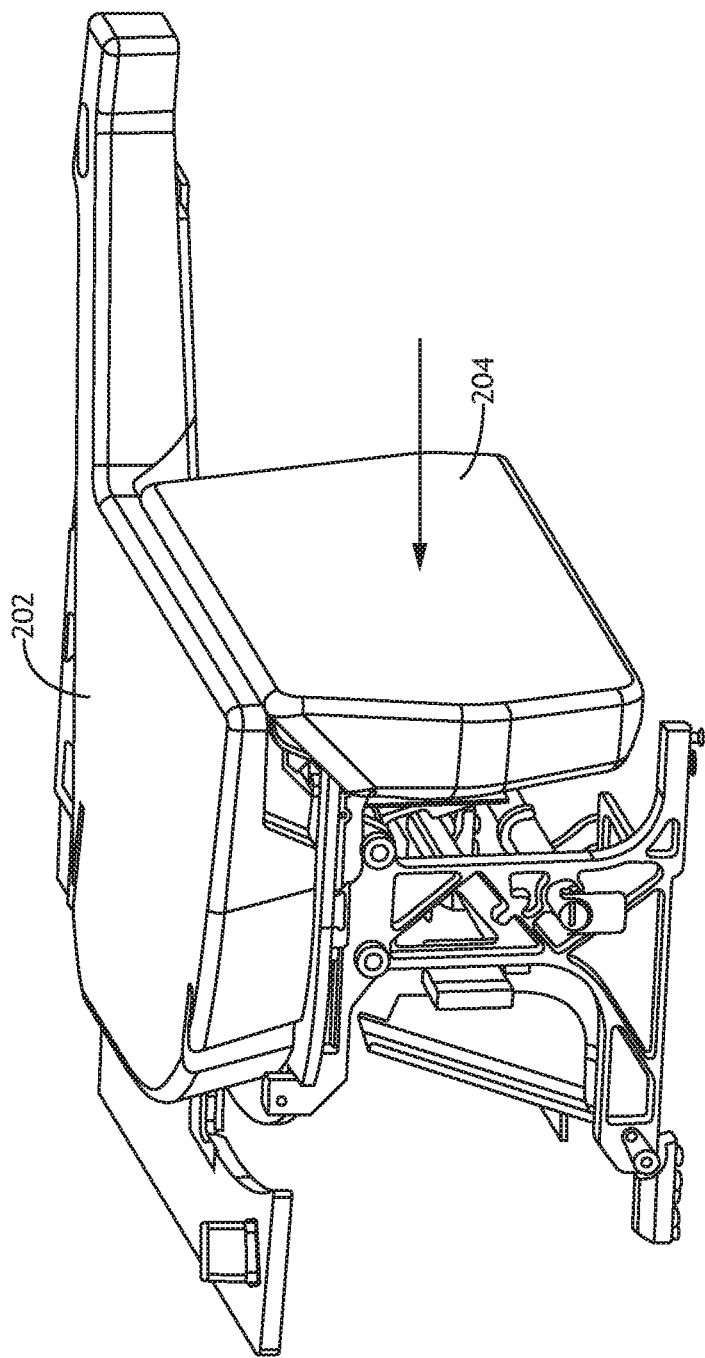
FIG. 2G shows a perspective view of an aircraft leg rest according to an exemplary embodiment during a stage of deployment and retraction.

When returning to a stowed configuration, because the translation lock is engaged, the leg rest 204 must first rotate, such as in FIG. 2E. Once the leg rest 204 is in a substantially vertical orientation, such as in FIG. 2F, the rotation arm disengages a rotation lock from a translation locking portion of the translation lock so that rotational movement is now locked and translational movement is unlocked. The leg rest 204 may then be translated to a stowed configuration under the seat portion, such as in FIG. 2G.

Figure 3:
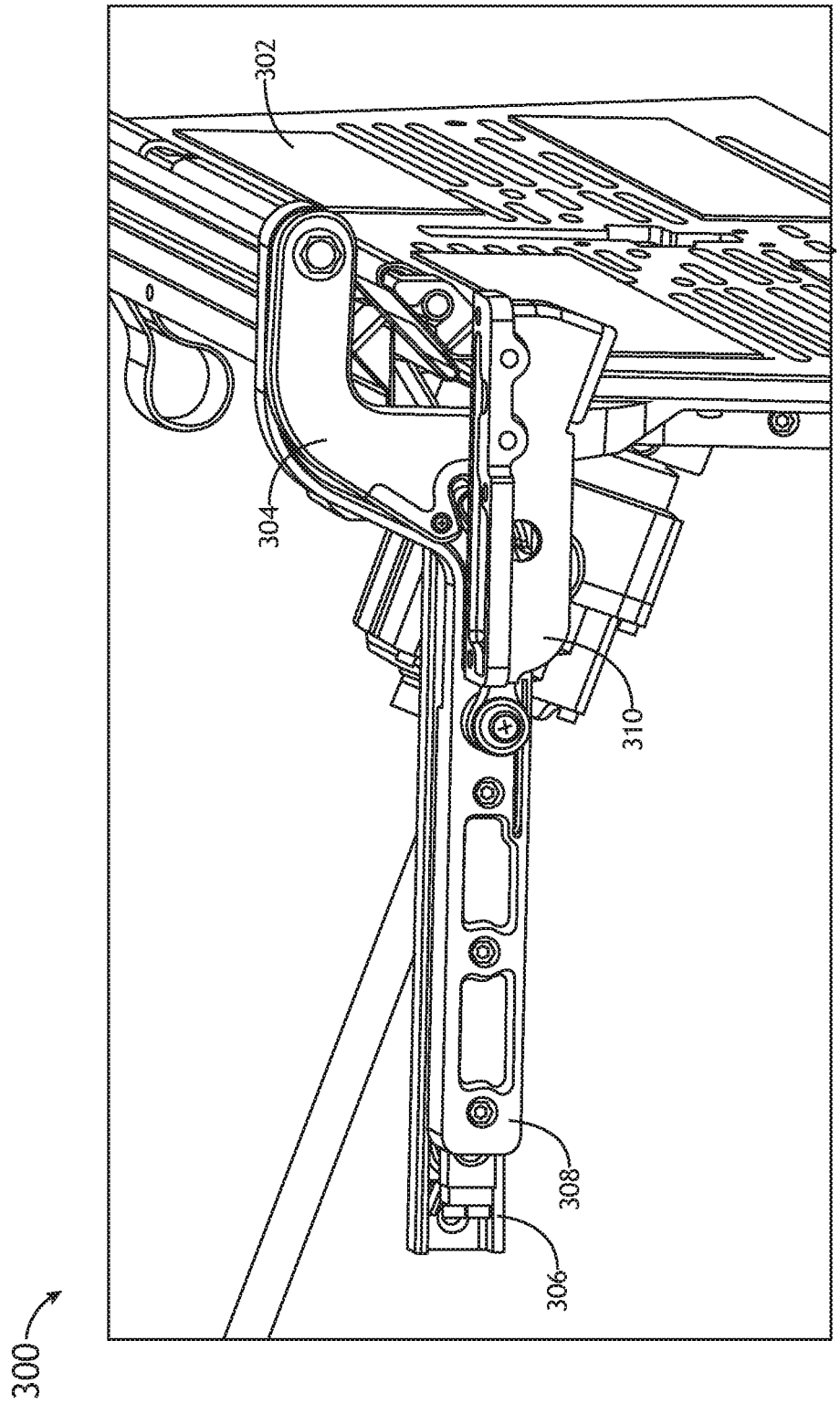
FIG. 3 shows a detail view of an exemplary embodiment.

Referring to FIG. 3, a detail view of an exemplary embodiment is shown. An aircraft seat with a deployable leg rest 302 includes a deployment control mechanism 300 having at least one rotation arm 304 fixedly connected to the leg rest 302 such that the leg rest 302 and rotation arm 304 pivot together. It may be appreciated that, although embodiments described herein are directed to a leg rest 302, with singular locking mechanisms, such mechanisms may be mirrored in whole or in part on opposing sides of the leg rest 302.

In at least one embodiment, the rotation arm 304 and leg rest 302 are pivotable connected to a distal portion of a translation rail 308. The translation rail 308 translates linearly along a fixed rail 306 disposed on the structure of the aircraft seat. A translation lock 310 prevents the rotation arm 304 from rotating until the translation rail 308 is fully translated as more fully described herein.

Figure 4:
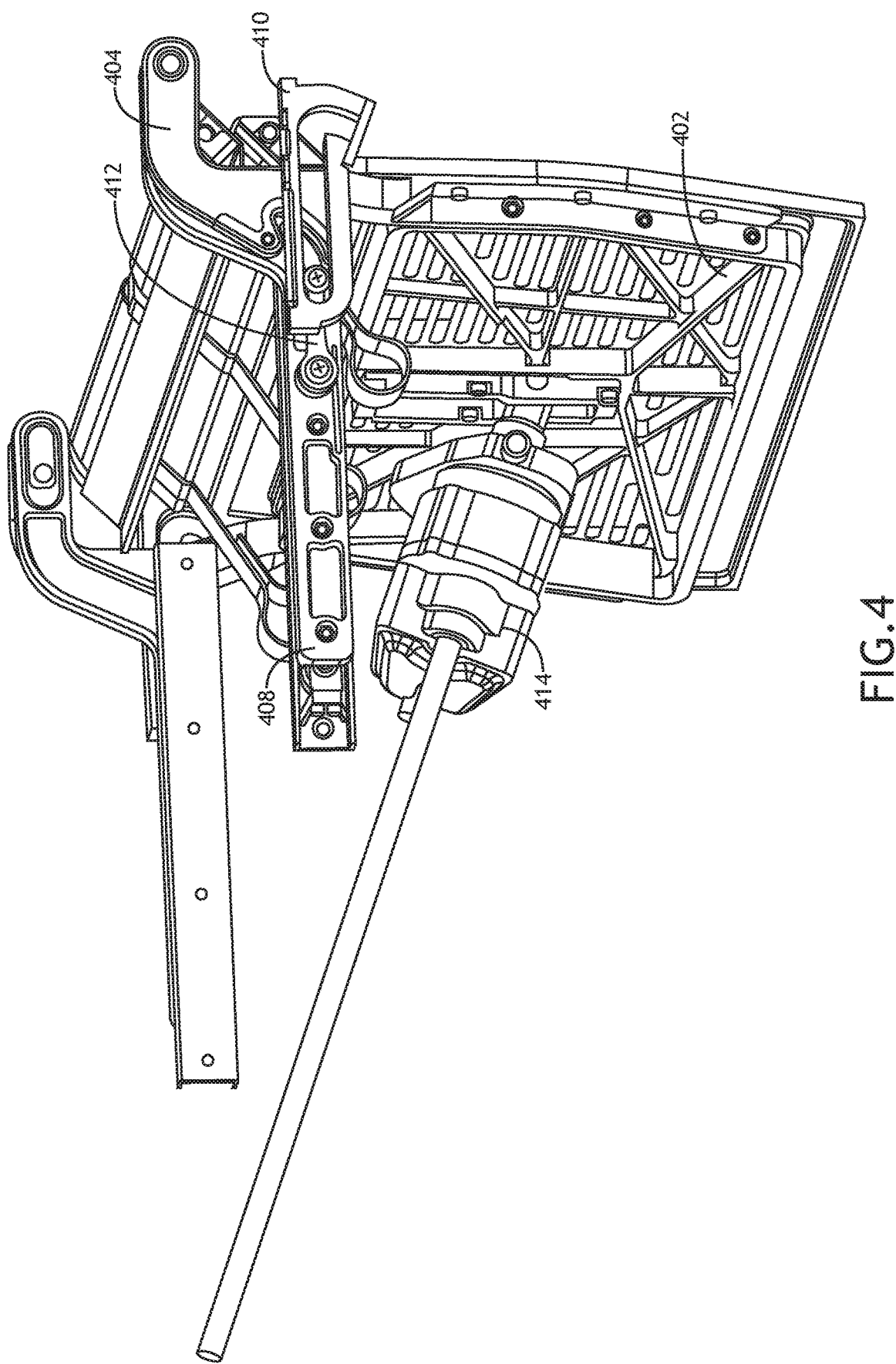
FIG. 4 shows a detail view of an exemplary embodiment.

Referring to FIG. 4, a detail view of an exemplary embodiment is shown. The deployment control mechanism 400 includes a linear actuator 414 connected to the leg rest 402. In at least one embodiment, the linear actuator 414 may be rotatable connected to the leg rest 402 and rotatably connected to the structure of the aircraft seat such that the linear actuator 414 may continue to apply a linear force to the leg rest 402 at an angle sufficient to induce translation or rotation at each appropriate phase of deployment or stowage.

In at least one embodiment, the deployment control mechanism 400 includes a rotation lock 412 disposed on the translation rail 408, configured to engage the translation lock 410 and rotation arm 404 as more fully described herein.

Figure 5:
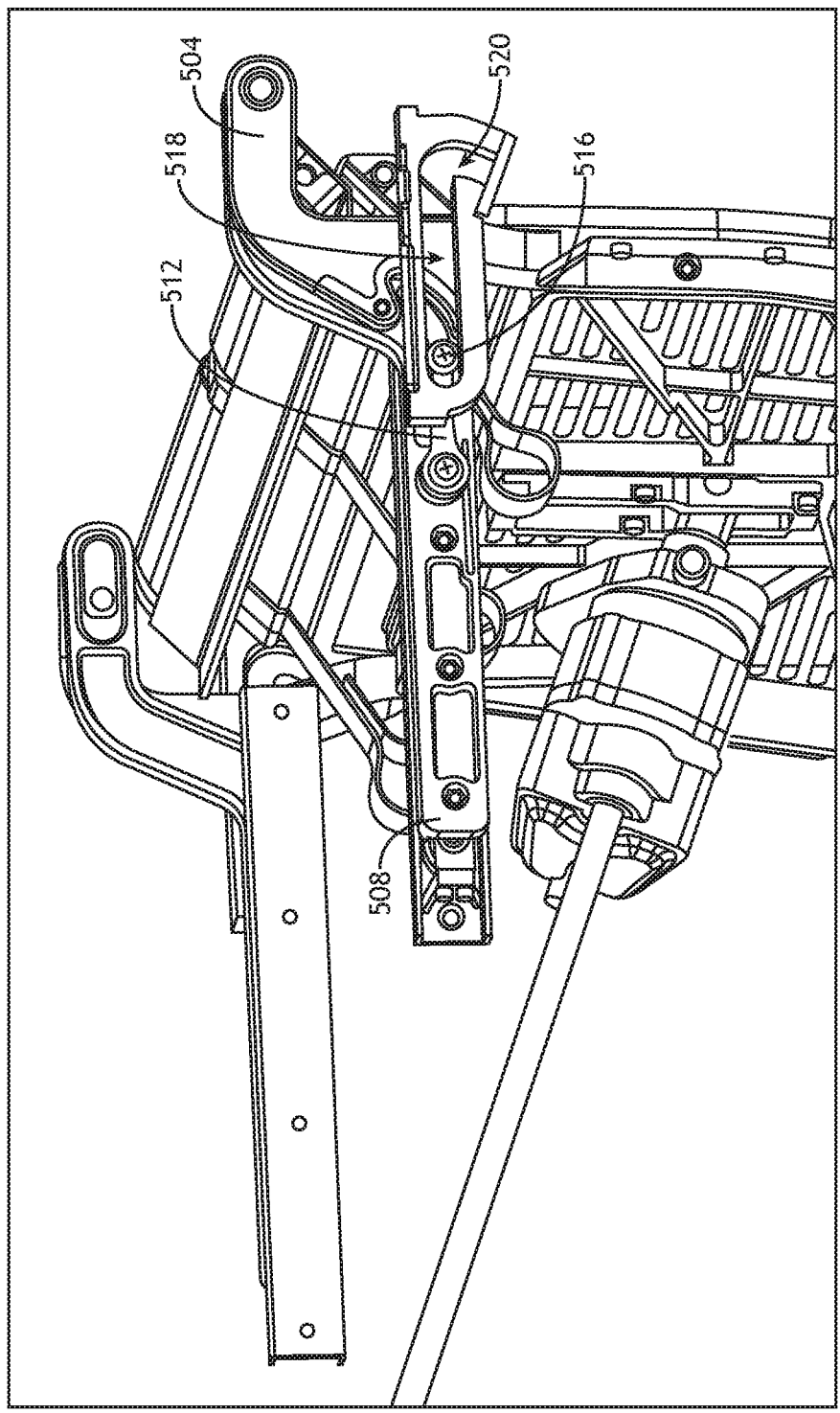
FIG. 5 shows a detail view of an exemplary embodiment.

Referring to FIG. 5, a detail view of an exemplary embodiment is shown. A rotation lock 512 disposed on a translation rail 508 includes a translation channel engaging element 516 configured to engage a translation channel 518 defined by the translation lock 510. In at least one embodiment, the translation channel 518 defines a stowed orientation by limiting the maximum travel of the translation channel engaging portion 516. Furthermore, the translation channel 518 includes a translation locking portion 520 that receives the translation channel engaging portion 516 to lower the rotation lock 512 and disengage it from the rotation arm 504 and allow rotation.

Figure 6:
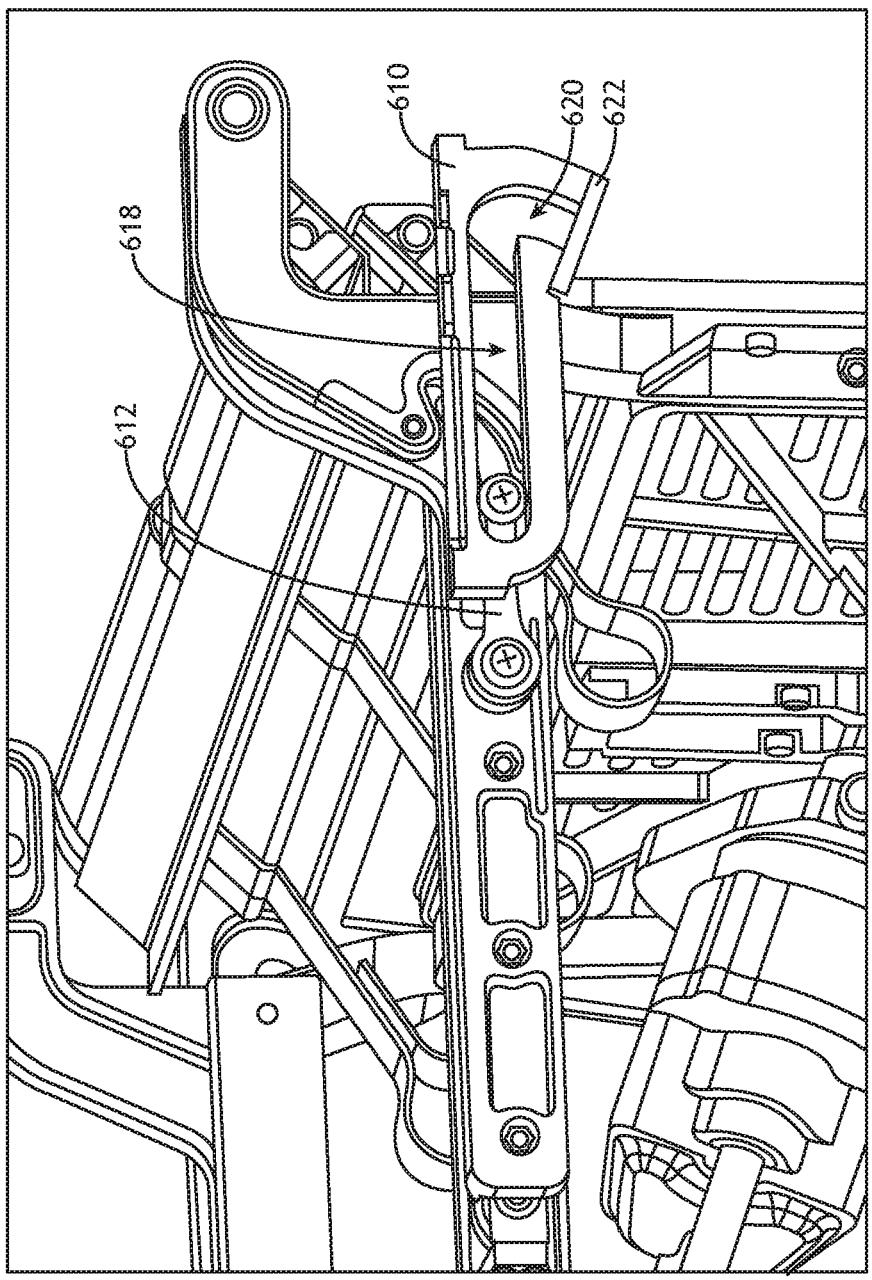
FIG. 6 shows a detail view of an exemplary embodiment.

Referring to FIG. 6, a detail view of an exemplary embodiment is shown. In at least one embodiment, a translation lock 610 defining a translation channel with a translation locking portion 620 may include a service plate 622 disposed at an open terminus of the translation locking portion 620 to allow the translation channel engaging portion 616 of rotation lock 612 to be completely removed from the translation channel.

Figure 7:
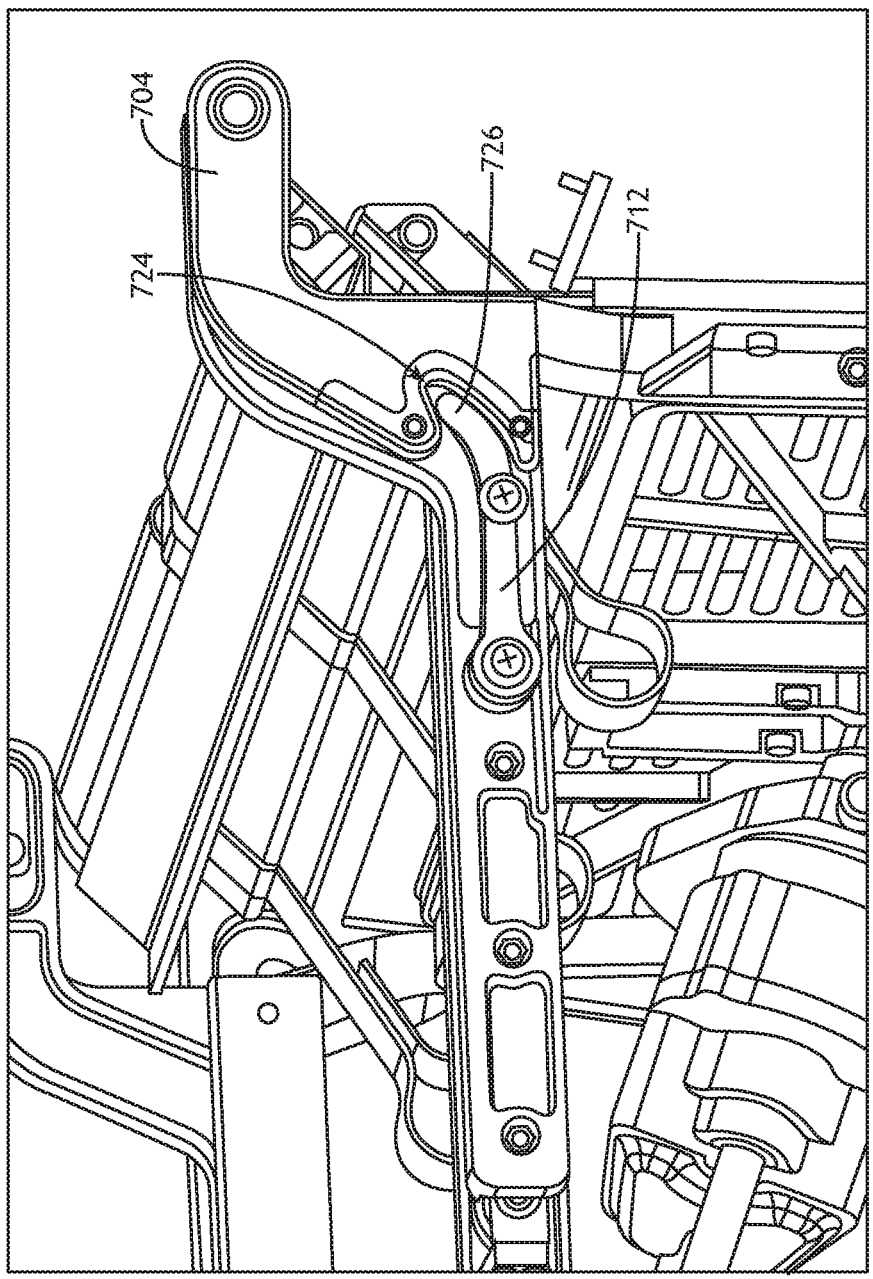
FIG. 7 shows a detail view of an exemplary embodiment.

Referring to FIG. 7, a detail view of an exemplary embodiment is shown. In at least one embodiment, a rotation lock 712 includes a rotation arm engaging portion 726 configured to engage a rotation locking channel 724 defined by a rotation arm 704. When engaged in the rotation locking channel 724, the rotation arm engaging portion 726 prevents the rotation arm 704 from rotating.

Figure 8:
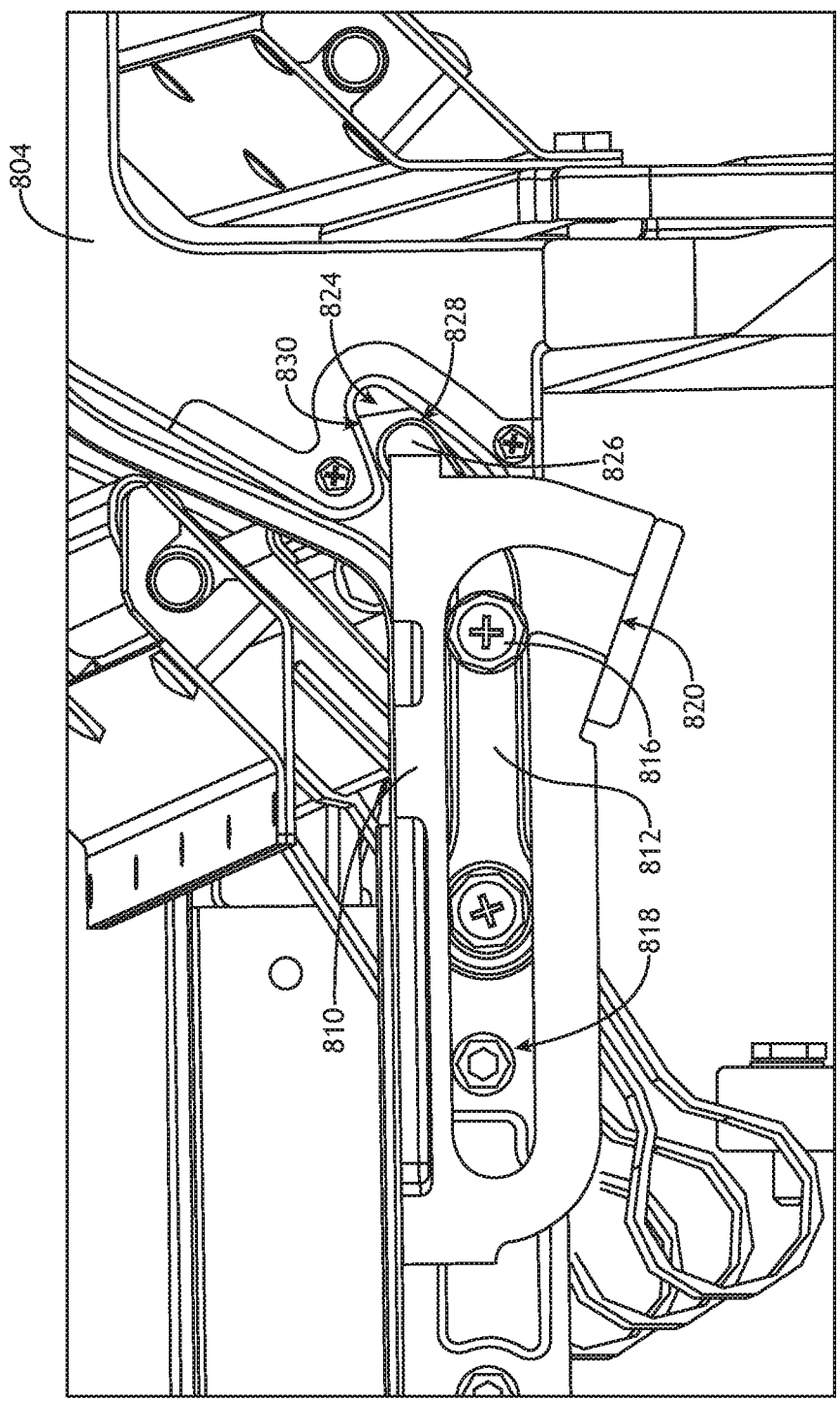
FIG. 8 shows a detail view of an exemplary embodiment.

Referring to FIG. 8, a detail view of an exemplary embodiment is shown. In at least one embodiment, during deployment, a rotation arm 804 is prevented from rotating by a rotation arm engaging portion 826 of a rotation lock 812. The rotation arm engaging portion 826 abuts a rotation locking surface 830 that defines a portion of a rotation locking channel 824.

During translation, a translation channel engaging portion 816 of the rotation lock 812 travels along a translation channel 818 defined by a translation lock 810. The translation channel engaging portion 816 prevents the rotation arm engaging portion 826 from disengaging from the rotation locking surface 830.

When the leg rest is fully translated, the translation channel engaging portion 816 enters a translation locking portion 820 which releases the rotation arm engaging portion 826 from the rotation locking channel 824, thereby allowing the rotation arm 804 to rotate. At the same time, because the translation channel engaging portion 816 cannot travel in the translation channel 818, the leg rest is prevented from translating. In at least one embodiment, the rotation lock 812 may be biased toward the translation locking portion 820 such as by a spring.

Figure 9:
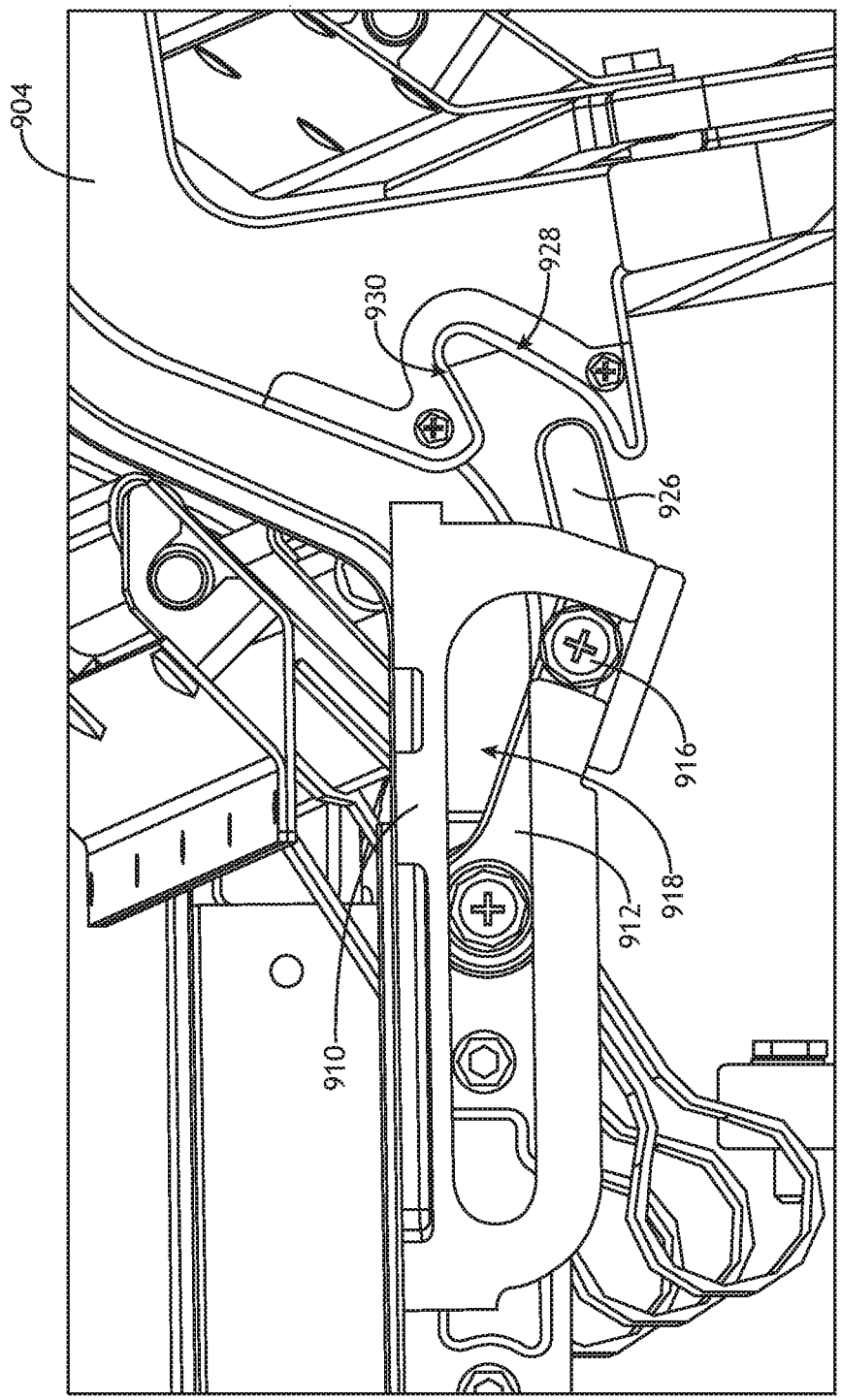
FIG. 9 shows a detail view of an exemplary embodiment.

Referring to FIG. 9, a detail view of an exemplary embodiment is shown. During retraction and stowage, a rotation lock 912 with a translation channel engaging portion 916 in a translation locking portion 920 of a translation channel 918 defined by a translation lock 910 prevents the leg rest from translating (moving backwards toward the seat). A rotation arm 904 connected to the leg rest defines a rotation locking channel with a rotation locking surface 930 and a translation lock disengaging surface 928. As the leg rest (and thereby rotation arm 904) is rotated toward a stowed orientation, the translation lock disengaging surface 928 abuts a rotation arm engaging portion 926 and lifts a corresponding translation channel engaging portion 916 out of a translation locking portion of the translation channel 918. Once the translation channel engaging portion 916 is completely disengaged from the translation locking portion, the rotation arm 904 is locked from rotating because the rotation arm engaging portion 926 abuts the rotation locking surface 930. The leg rest may then translate to a stowed orientation under the seat.

It may be appreciated that while specific embodiments described herein are directed toward a leg rest, deployable by a single linear actuator, where the leg rest first translates and then rotates, other embodiments are envisioned. For example, by placing the translation locking portion of the translation channel on the other side of the translation channel (distal to the leg rest instead of proximal), the leg rest may first rotate and then translate while deploying.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A leg rest apparatus comprising:
   a translation rail;
   a rotation arm defining a rotation locking channel;
   a translation lock defining a translation channel, the translation channel including a translation locking portion; and
   a rotation lock,
   wherein:
      the rotation lock is configured to:
         engage the translation channel;
         engage the rotation locking channel during translation; and
         engage the translation locking portion when translation is complete.

2. The leg rest apparatus of claim 1, wherein the rotation lock is configured to disengage from the rotation locking channel when engaging the translation locking portion.

3. The leg rest apparatus of claim 1, wherein the rotation locking channel defines a translation unlocking surface configured to apply a force to the rotation lock to disengage the rotation lock from the translation locking portion.

4. The leg rest apparatus of claim 1, wherein the rotation lock is disposed on the translation rail.

5. The leg rest apparatus of claim 1, further comprising an actuator configured to apply a linear force to a leg rest.

6. The leg rest apparatus of claim 1, wherein the translation lock comprises a service plate disposed over an open terminal of the translation locking portion, configured to be removed to disengage the rotation lock from the translation channel.

7. The leg rest apparatus of claim 1, wherein the rotation arm is rotationally disposed on a terminus of the translation rail.

8. An aircraft seat comprising:
   a leg rest;
   at least one translation rail;
   at least one rotation arm fixedly disposed on the leg rest, each defining a rotation locking channel;
   at least one translation lock, each defining a translation channel, the translation channel including a translation locking portion; and
   at least one rotation lock,
   wherein:
      each rotation lock is configured to:
         engage a corresponding translation channel;
         engage a corresponding rotation locking channel during translation; and
         engage a corresponding translation locking portion when translation is complete.

9. The aircraft seat of claim 8, wherein each rotation lock is configured to disengage from the corresponding rotation locking channel when engaging the corresponding translation locking portion.

10. The aircraft seat apparatus of claim 8, wherein each rotation locking channel defines a translation unlocking surface configured to apply a force to the corresponding rotation lock to disengage the rotation lock from the corresponding translation locking portion.

11. The aircraft seat apparatus of claim 8, wherein each rotation lock is disposed on the corresponding translation rail.

12. The aircraft seat apparatus of claim 8, further comprising an actuator configured to apply a linear force to the leg rest.

13. The aircraft seat apparatus of claim 8, wherein each translation lock comprises a service plate disposed over an open terminal of the translation locking portion, configured to be removed to disengage the rotation lock from the corresponding translation channel.

14. The aircraft seat apparatus of claim 8, wherein each rotation arm is rotationally disposed on a terminus of the corresponding translation rail.

15. The aircraft seat apparatus of claim 8, wherein the leg rest is substantially flush with a seat portion when fully deployed.

* * * * *